United States Patent
Haque et al.

(10) Patent No.: US 11,966,225 B2
(45) Date of Patent: Apr. 23, 2024

(54) LOCALIZATION BASED ON SENSOR DATA

(71) Applicant: Lyft, Inc., San Francisco, CA (US)

(72) Inventors: Asif Haque, Orinda, CA (US); James Kevin Murphy, San Francisco, CA (US); Yuanyuan Malek, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 177 days.

(21) Appl. No.: 16/983,593

(22) Filed: Aug. 3, 2020

(65) Prior Publication Data

US 2020/0363807 A1 Nov. 19, 2020

Related U.S. Application Data

(63) Continuation of application No. 15/859,421, filed on Dec. 30, 2017, now Pat. No. 10,732,635.

(51) Int. Cl.
| | |
|---|---|
| G05D 1/02 | (2020.01) |
| G01C 21/20 | (2006.01) |
| G01S 5/00 | (2006.01) |
| G01S 19/13 | (2010.01) |
| G01S 19/48 | (2010.01) |
| G05D 1/00 | (2006.01) |

(52) U.S. Cl.
CPC .......... *G05D 1/0212* (2013.01); *G01C 21/20* (2013.01); *G01S 5/011* (2020.05); *G01S 19/48* (2013.01); *G05D 1/0274* (2013.01); *G05D 1/0278* (2013.01); *G05D 1/0285* (2013.01); *G01S 19/13* (2013.01); *G01S 19/485* (2020.05)

(58) Field of Classification Search
None
See application file for complete search history.

(56) References Cited

U.S. PATENT DOCUMENTS

| | | | | |
|---|---|---|---|---|
| 8,855,904 | B1* | 10/2014 | Templeton | G08G 1/0141 |
| | | | | 701/119 |
| 8,976,063 | B1* | 3/2015 | Hawkins | G01S 5/017 |
| | | | | 342/357.32 |
| 2014/0232570 | A1* | 8/2014 | Skinder | G01C 21/20 |
| | | | | 340/989 |
| 2017/0219360 | A1* | 8/2017 | Cui | G01C 21/3815 |

* cited by examiner

*Primary Examiner* — Aniss Chad
*Assistant Examiner* — Mahmoud M Kazimi
(74) *Attorney, Agent, or Firm* — Baker Botts L.L.P.

(57) ABSTRACT

In one embodiment, a method includes receiving a sequence of location data points associated with a vehicle from a first source and a sequence of motion data points associated with the vehicle from a second source. The method includes determining a first turn angle of the vehicle based on at least one location data point in the sequence of location data points associated with the first source. The method includes determining that an additional location data point in the sequence of location data points is inaccurate. The method includes determining a second turn angle of the vehicle by using at least one motion data point in the sequence of motion data points corresponding to the additional location data point that is inaccurate. The method includes determining a turn trajectory of the vehicle by using at least the first turn angle and the second turn angle.

20 Claims, 11 Drawing Sheets

LOCALIZATION BASED ON SENSOR DATA

PRIORITY

This application is a continuation under 35 U.S.C. § 120 of U.S. patent application Ser. No. 15/859,421, filed 30 Dec. 2017, now U.S. Pat. No. 10,732,635.

BACKGROUND

A transportation management system facilitates rides for users using service vehicles, which may be human operated or autonomous. During a ride, the vehicle may make many turns to navigate to its destination. The transportation management system may receive information about the ride from the vehicle or from a computing device associated with a driver of the vehicle to track the vehicle as it provides transportation to users. Traditional transportation matching systems rely on Global Positioning System (GPS) data from a computing device (e.g., smartphone) of a ride provider or ride requestor inside a vehicle to determine the vehicle's location and to estimate the path traveled by the vehicle. For example, GPS data on the requestor device or provider device may be used to determine a vehicle's location and to estimate the path traveled by the vehicle. However, GPS data can be noisy and is not accurate enough for some applications of a transportation management system.

DESCRIPTION OF EXAMPLE EMBODIMENTS

Figure 1:
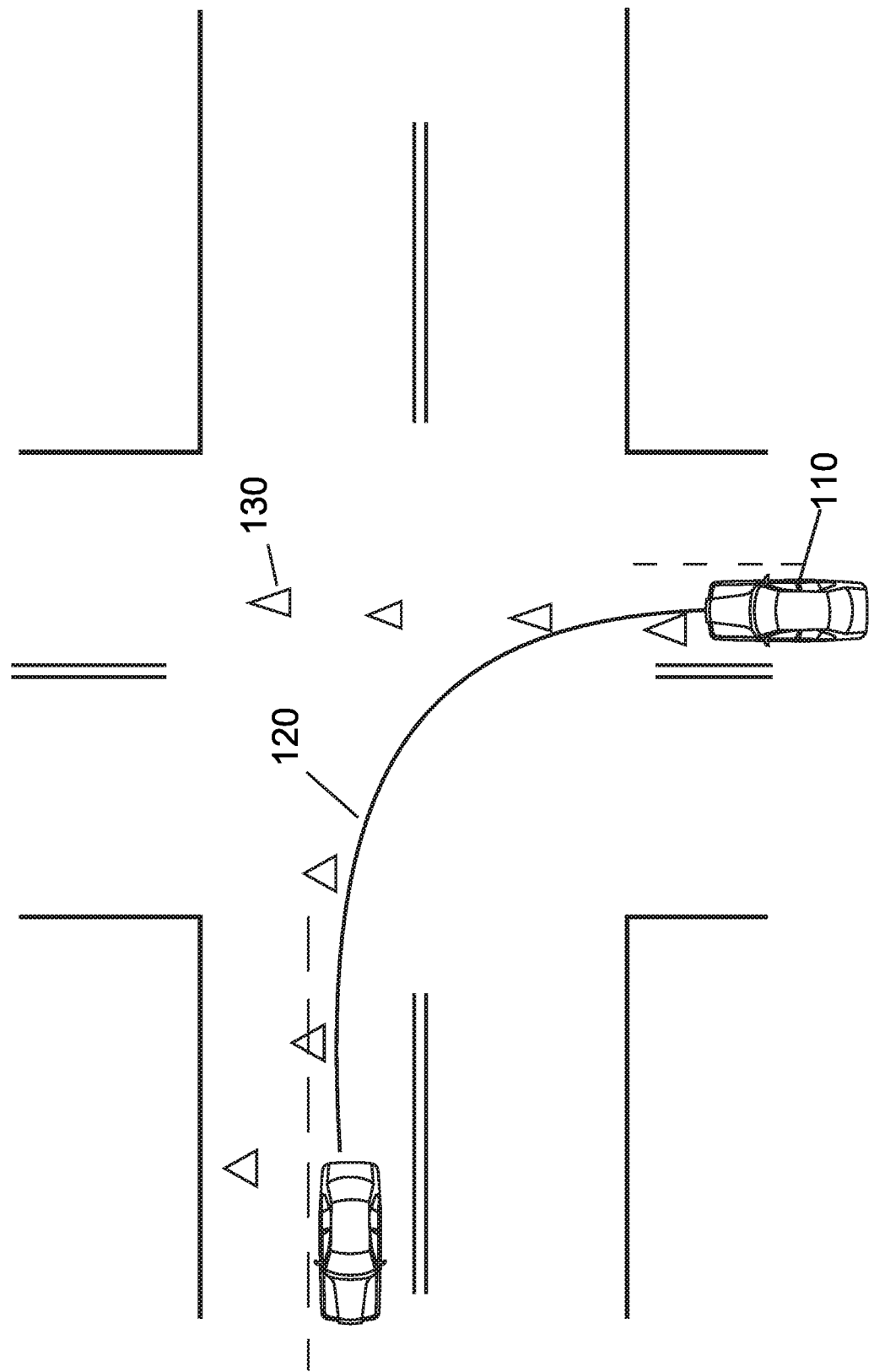
FIG. 1 illustrates an example path traveled by a vehicle along with example location data for the vehicle.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Traditional transportation matching systems rely on Global Positioning System (GPS) data from a provider computing device (e.g., smartphone) inside a vehicle (e.g., the vehicle providing a ride to a user) to determine the vehicle's location and to estimate the path traveled by the vehicle. GPS data from such computing devices is typically accurate to within four to eight meters when the computing device is experiencing good connectivity. This is sufficient for general navigation purposes when the vehicle is operated by a human driver. However, using such GPS data is insufficient in two common scenarios: (1) when the computing device experiences poor GPS connectivity, and (2) when the vehicle is operated by an autonomous navigation system instead of a human driver. For example, poor connectivity may occur in dense cities with many tall buildings (e.g., NYC, Chicago, Los Angeles, Beijing, Dubai), in tunnels or when otherwise underground, and in areas where the geography of the terrain impacts the connectivity (e.g., canyons, steep mountain areas, etc.). In these locations, GPS connectivity may be poor due to GPS signals being blocked by the myriad tall buildings, geographic features (e.g., tress, canyons, etc.), and/or earth and soil surrounding the computing device, respectively. Further, GPS data may not be sufficiently accurate for successful navigation of an autonomous vehicle. For example, autonomous-vehicle navigation may require location accuracy that is more precise than what GPS can offer as the vehicle may need to know within inches or centimeters where the vehicle should be located, turning, etc. in order to safely navigate without a driver.

For example, FIG. 1 illustrates an example path 120 traveled by a vehicle 110 along with example location points 130 for the vehicle where the vehicle is in a dense urban environment with poor GPS connectivity. The location points 130 may be obtained from location data (e.g., GPS data from a GPS unit on a mobile computing device inside the vehicle). The path 120 may represent a path traveled by the vehicle as it makes a left turn through an example intersection. As illustrated by the example location points 130, at least some of the location points 130 may inaccurately portray the vehicle's position. This may lead to other inaccuracies, such as inaccuracies in distance traveled, time to destination, fare to charge, and other metrics that may be useful to users of the transportation management system as well as to the transportation management system itself.

As a solution to the above problem, the transportation management system may rely on other sensor data from the provider or requestor computing devices (or both) in place of or in addition to the location data sent by the mobile computing device in order to obtain and/or determine a more granular and accurate location of the vehicle and/or the corresponding computing devices. The sensor data may be obtained from sensors on the computing device, and may include gyroscope data, accelerometer data, barometer sensor data, compass data or any other suitable sensor data. The mobile computing device may be equipped with a gyroscope, which measures the rate at which the device rotates around a spatial axis. Many devices have a three-axis gyroscope, which delivers rotation values in each of the three axes shown in FIG. 2. Rotation values may be measured in radians per second around each given axis. Rotation values may be positive or negative depending on the direction of rotation. The rotation data may be used to determine how much the vehicle has turned within a given timeframe. As an example and not by way of limitation, the gyroscope data may be used to determine that a car has turned 0.3 radians within a timeframe of one second.

Figure 2:
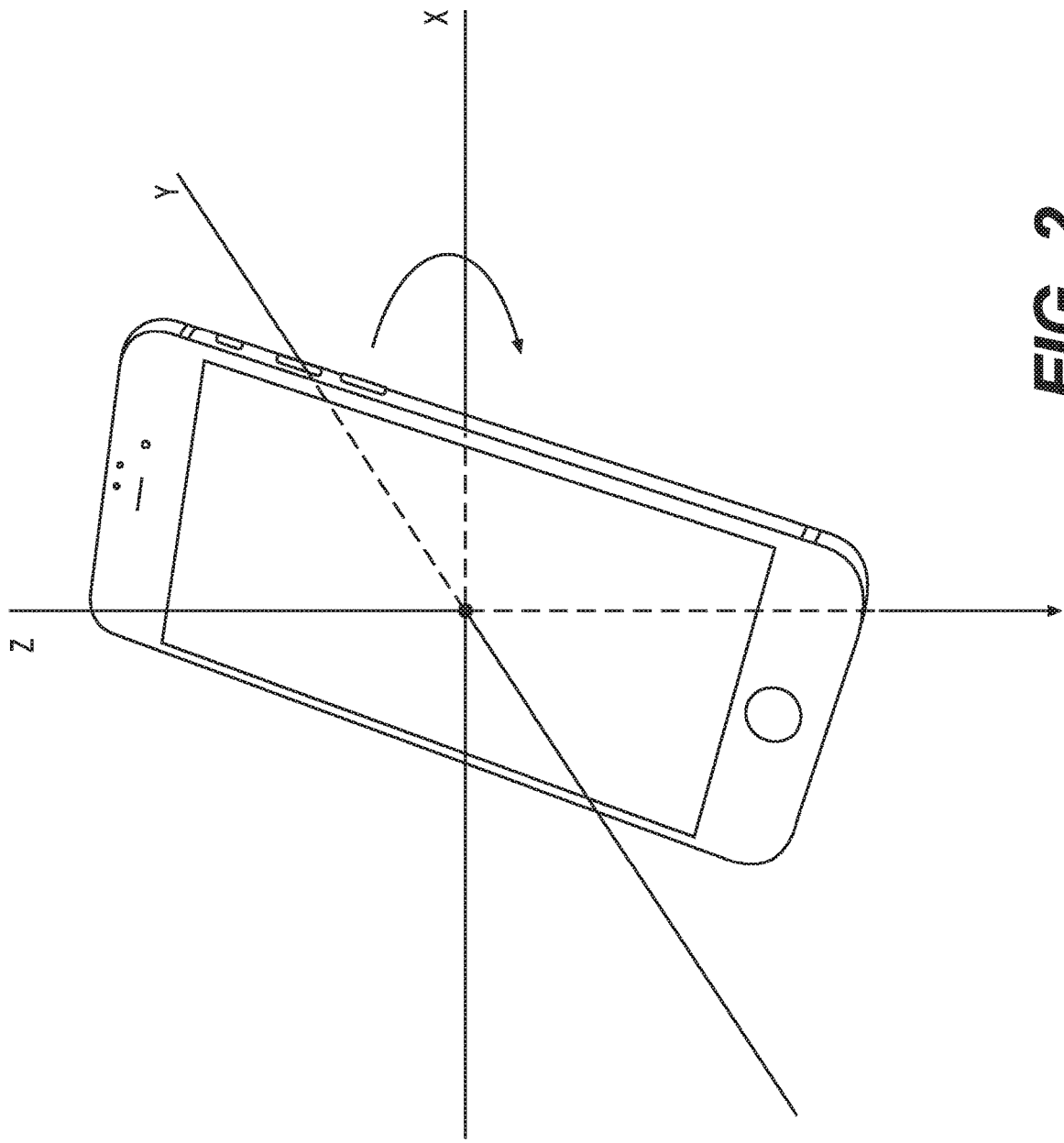
FIG. 2 illustrates an example mobile computing device and an example three-dimensional coordinate system.

FIG. 2 illustrates an example mobile computing device and an example three-dimensional coordinate system. When a vehicle is in use, it is assumed that the computing device is fixed relative to the vehicle. If the vehicle is being operated by a human driver, the driver's mobile computing device may be mounted to, for example, the dashboard of the vehicle. If the service device is an autonomous navigation vehicle, the computing device may be a device within the autonomous vehicle's navigation system or other suitable computing system associated with the autonomous vehicle. In either case, the computing device with the appropriate sensors (e.g., gyroscope, accelerometer, barometer) may be fixed relative to the vehicle. In many cases, the mobile computing device may not be fixed in a perfectly vertical orientation; that is, the device may be tilted at an angle (as is illustrated in FIG. 2) so that the screen may be more easily viewed by the driver. Although a particular computing device is shown in FIG. 2 (i.e., a smartphone), this disclosure contemplates any suitable computing device or combination of computing devices that are capable of performing the methods discussed herein. As an example and not by way of limitation, the computing device may be built into the vehicle (e.g., as part of a navigation system). If the vehicle's computing device is equipped with a gyroscope, accelerometer, barometer, or any other relevant components, the methods discussed herein may be performed primarily by the vehicle's computing device. In particular embodiments, the computing device that is built into the vehicle may only have GPS capabilities. For example, in such a scenario, the GPS data (e.g., location points) may be measured by the vehicle's computing device and the motion units may be measured by a computing device of the provider or requestor.

Software installed on the computing device (e.g., smartphone) may use the gyroscope data to track the rotation about the vertical axis (e.g., axis that is aligned with the gravitational force) for a particular time window (e.g., 5 seconds). To track its rotation about the vertical axis, the device may perform three steps: (1) rotate the rotation readings from the gyroscope to a frame in which the measured gravity vector points along the vertical axis; (2) record the rotation about the vertical axis that occurred during several sub-windows of the specified time window; and (3) integrate the rotation over time using numerical quadrature to produce a total turn for the specified time window. In particular embodiments, to orient its gyroscope data with the vertical axis, the computing device may sense the direction of gravity (e.g., using accelerometer readings). The direction of gravity may be represented as a three-dimensional gravity vector. The device may measure gravity with respect to its own coordinate system, so the measured gravity vector may be pointed in any direction relative to the device's coordinate system. The computing device may calculate the difference between the gravity vector and the vertical axis. For example, if the phone is oriented in a vertical position, the measured gravity vector may already be (0, 0, −1) and therefore is aligned with the vertical axis and there would be no difference between the two. However, if the phone is oriented at an angle of 45 degrees relative to the vertical axis, the gravity vector will still point straight down, but since the gravity vector is measured in the device's own coordinate system, the gravity vector may be represented by, e.g., (1, 1, −1).

In particular embodiments, the device may isolate its rotation data about the vertical axis. The device's gyroscope may measure rotation data about the x-axis of the device's coordinate space, rotation data about its y-axis, and rotation data about its z-axis. For each set of rotation data measured by the gyroscope, there may an associated gravity vector measured at substantially the same time. In particular embodiments, the rotation data and the gravity vector are represented within the device's coordinate system. To isolate the rotation data of the device about the gravity vector, the rotation data about the three axes may be rotated in a manner that would cause the gravity vector to be aligned with the vertical axis (e.g., negative z-axis) if the gravity vector undergoes a similar rotation. The relative relationship between the original rotation data and the gravity vector would be the same as the relative relationship between the rotated rotation data and the vertical axis (to which the rotated gravity vector is aligned). Doing so would simplify the computation for rotation data about the gravity vector.

Once the rotation amount for causing the gravity vector to be aligned with the vertical axis is determined, that rotation amount may be used to rotate the rotational data from the gyroscope, as discussed above. Then, the device's rotation about the vertical axis may be determined and recorded. Sensor readings may be taken at regular intervals corresponding to each sub-window of time. The intervals may be any suitable length, including 1 reading per second, 10 readings second, or 50 readings per second. Using a gyroscope and optionally a compass installed on the computing device, the device may determine the degree of rotation about the gravity vector at each sub-window of time. For example, if a specified window of time is five seconds and each sub-window lasts 1 second, the window will have 5 sub-windows: one sub-window for each second. At the beginning (or, alternatively, the end, middle, or any other suitable point) of each sub-window, the computing device may measure the rotation about the vertical axis that has occurred since the last sub-window. Other sensor measurements may be taken at each sub-window as well, including GPS coordinates, barometer data, accelerometer data, or any other suitable data.

The vertical axis (e.g., z-axis in FIG. 2, which the gravity vector may be rotated to align with) may be the only axis about which rotation is measured because a vehicle only turns left or right. There may be no or very minimal change about the other two axes (e.g., there may be no change in the pitch or roll of the vehicle). In particular embodiments, once the rotation about the vertical axis at each sub-window has been recorded, the computing device may integrate the rotation data over time by numerical quadrature (e.g., numerical integration) to produce a total turn for the specified time window. In particular embodiments, numerical quadrature may be implemented using the trapezoidal rule. The trapezoidal rule is a method for approximating a definite integral using linear approximations. An area under a curve is divided into several partitions, and each partition is approximated as a trapezoid. The area of each trapezoid is computed and summed with the areas of all the trapezoids under the curve. Using this method, the area under the curve can be approximated without expending excessive computing resources. In particular embodiments related to this disclosure, the area under the curve may be the amount the computing device has rotated about the vertical axis during the entire time window. The partitions may be the sub-windows, and the trapezoids may be the amount the computing device has rotated about the vertical axis during each sub-window. By calculating the amount of rotation during each sub-window and then summing the rotations, the computing device may determine how much the computing device has rotated during the entire time window. Accordingly, the mobile device may be configured to determine an amount of rotation about a z-axis and report the amount of rotation as a turn angle since the last reported turn angle.

In particular embodiments, the computing device may send data to the transportation management system. The data sent to the transportation management system may include location points (e.g., GPS data), gyroscope data, accelerometer data, barometer data, and any other suitable type of data. The data may be sent in packets that include multiple data units. A data unit may include sensor data measurements for a specific period (e.g., 1 second). As an example and not by way of limitation, a data packet may include five data units that each corresponds to one second of time. Thus, a data packet may correspond to a time window (e.g., 5 seconds) and each data unit may correspond to a sub-window (e.g., 1 second). Sending the data units in packets of data units may help reduce network traffic. The transportation management system may be managing hundreds or thousands of vehicles at any given time, so the volume of data transmitted from each computing device may be a strain on the system's servers. Transmitting multiple data units at once in packets may reduce the volume of information that is transmitted to the transportation management system, which may in turn reduce strain on the system.

As an example and not by way of limitation, the sensors on the computing device may sample at a high rate, such as 50 Hz. This means that the sensors may take 50 samples per second. One second may be a sub-window. Receiving and processing 50 data points per second may be too much for a server that is receiving data from thousands of devices. To reduce the load, the 50 samples may be reduced to a single data unit. The data unit may summarize or contain information about each of the 50 samples that were taken during the sub-window. Instead of sending 50 data points, the computing device may send the single data unit to the server. In particular embodiments, multiple data units may be contained in a data packet (as discussed above). For example, a data packet may include five data units, which may each include data from 50 samples taken during each sub-window.

Each data unit may contain information about the computing device for its corresponding second of time. For example, the data unit may include GPS coordinates that indicate the device's location for the corresponding second, gyroscope data that indicates a delta turn angle for the corresponding second, accelerometer data that indicates the average acceleration of the computing device for the corresponding second, barometer data that indicates the elevation of the computing device for the corresponding second, and any other suitable information. Accordingly, the mobile computing device may be equipped with an accelerometer and a barometer and may report readings associated with these sensors along with the gyroscope and/or GPS location readings. An accelerometer is an electromechanical device used to measure acceleration forces. The accelerometer can measure the acceleration applied to the mobile computing device, for example, when the vehicle accelerates or brakes. The mobile computing device may also be equipped with a barometer. A barometer may provide data indicating the elevation of the mobile computing device based on measured air pressure.

For example, a set of example data packet information is summarized in Table 1 below. The column titled "GPS Data" may include location points (e.g., coordinates) and the three columns labeled "Gyroscope Data," "Accelerometer Data," and "Barometer Data" may include motion data (e.g., gyroscope data, accelerometer data) or any other suitable type of data (e.g., elevation data as measured by a barometer or other suitable instrument on the computing device).

TABLE 1

Example Data Packet Information

| Time | GPS Data | Gyroscope Data (delta turn angle) | Accelerometer Data | Elevation Data |
|---|---|---|---|---|
| 1 | 41.40338, 2.17403 | .314 RAD | 3.24 m/s$^2$ | 29.70 Hg |
| 2 | 41.41245, 2.20551 | .299 RAD | 2.56 m/s$^2$ | 29.71 Hg |
| 3 | 41.50334, 2.29129 | .321 RAD | 1.98 m/s$^2$ | 29.70 Hg |
| 4 | 41.46398, 2.34656 | .315 RAD | 0.54 m/s$^2$ | 29.72 Hg |
| 5 | 41.99834, 2.45963 | .309 RAD | −0.72 m/s$^2$ | 29.70 Hg |

Figure 3:
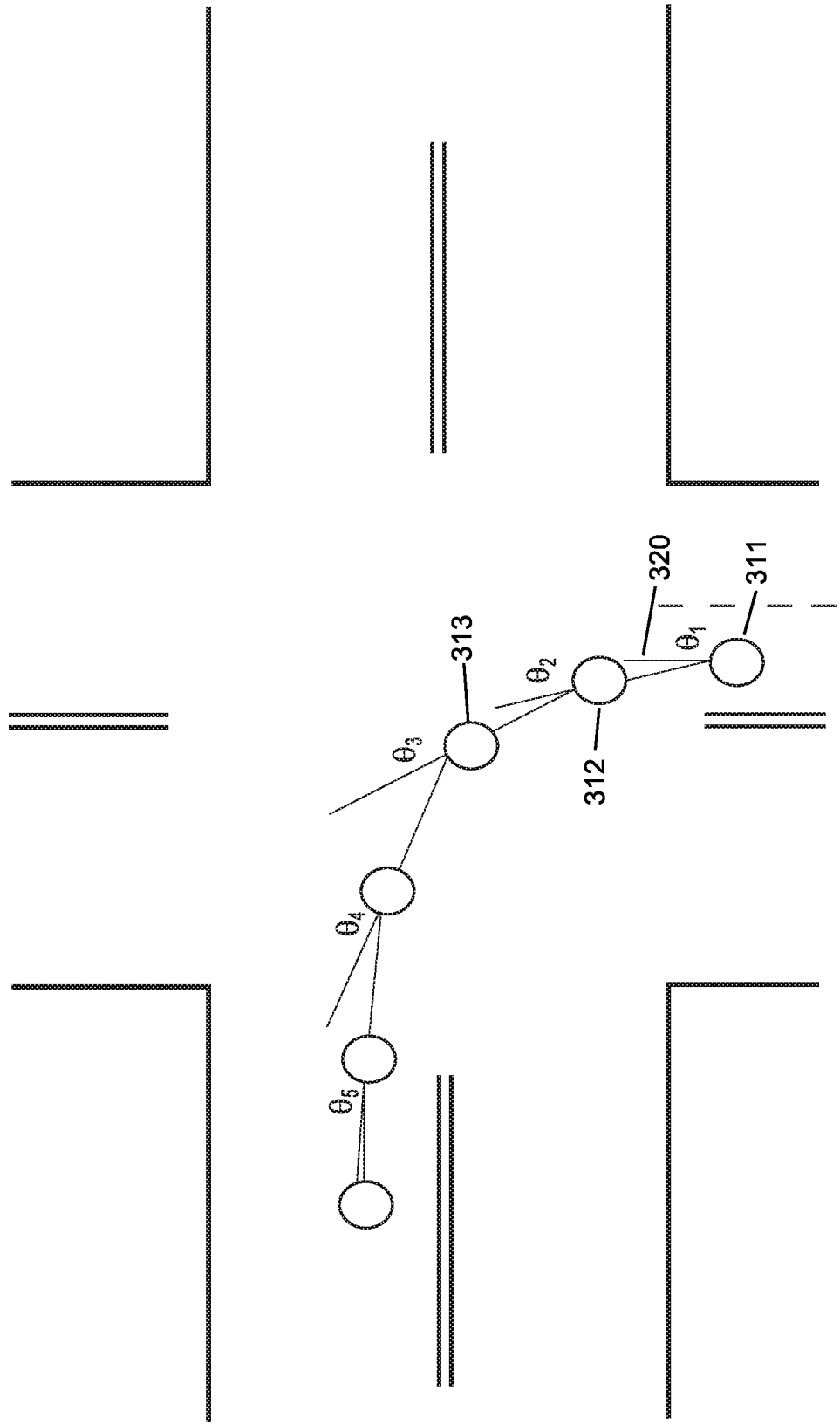
FIG. 3 illustrates an example representation of motion data for a mobile computing device.

FIG. 3 illustrates an example representation of motion data for a mobile computing device. Each circle represents a motion unit for a different time period. For example, circle 311 represents the motion unit for time t=0s, circle 312 represents the motion unit for time t=1s, circle 313 represents the motion unit for time t=2s, and so on. As discussed above, each motion unit may include information about the motion of the computing device for its respective time period. Each motion unit may additionally include a velocity and a heading. As an example and not by way of limitation the motion unit represented by circle 311 may have a heading 320 and a velocity of 0 mph. Alternatively or in addition, the heading may be determined based on the vehicle's trajectory as determined from GPS data over a period of time. GPS data may still provide a reliable heading even if it is noisy. The heading may be thought of as an arrow pointing out of the back of the computing device if the device is a smartphone. For example, if the smartphone is mounted on the dashboard of the vehicle, the heading may point out toward the front windshield. With reference to FIG. 2, the heading may point along the positive Y axis (e.g., out from the back of the smartphone) if the smartphone is mounted to the dashboard and is facing the vehicle cabin. The heading may be used to determine the direction that the vehicle is pointed. For example, if the vehicle is pointed north, the heading may also be pointing north. If the computing device is mounted at an angle, the transportation management system may detect this and account for this when determining the heading of the motion unit. For example, if the computing device is tilted toward the driver at an angle of 15 degrees, the transportation management system can determine this when the vehicle is driving in a straight line. Determining the velocity associated with the motion unit is discussed below.

The transportation management system (or, alternatively, software downloaded from the transportation management system and installed on the computing device) may determine a location for each motion unit based on one or more of the gyroscope data, the accelerometer data, and the barometer data. For the sake of simplicity, this disclosure will discuss the methods as being performed by a transportation management system, but this disclosure contemplates the methods discussed herein as being performed by any suitable computing device or system, including the computing device associated with the vehicle (e.g., the driver's computing device or a computing device of the autonomous vehicle, if applicable), or a computing device associated with the user. The motion units may be plotted on a digital map at their determined locations, as shown in FIG. 3.

Figure 4:
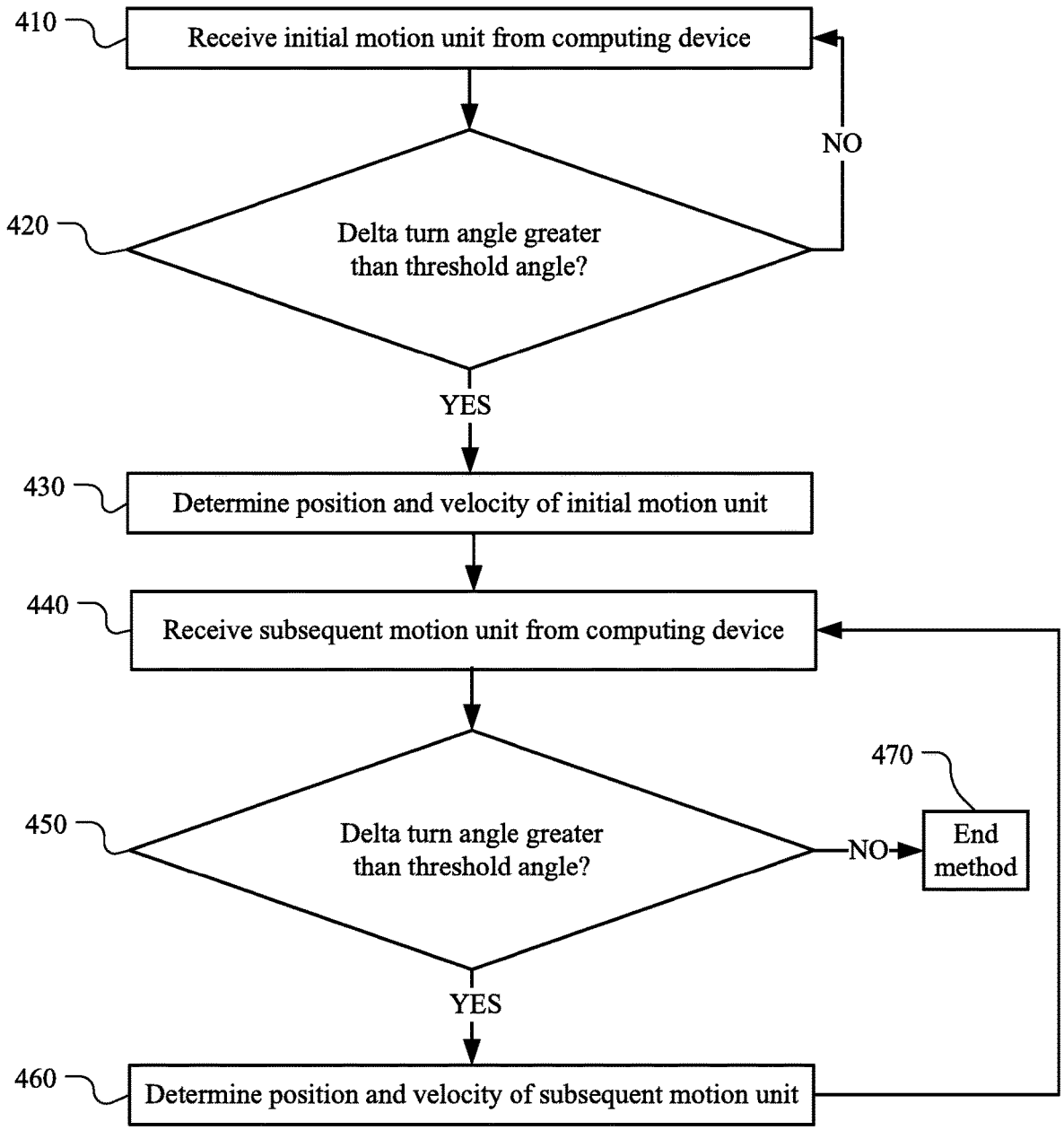
FIG. 4 illustrates an example method for determining the positions of motion units during a turn of a vehicle for plotting on a digital map.

FIG. 4 illustrates an example method 400 for determining the positions of motion units during a turn of a vehicle for plotting on a digital map. The transportation management system may be particularly interested in turns that the vehicle makes because turning may affect routing provided by the transportation management system, estimated time of arrival (ETA) for a vehicle to a requestor, may indicate that a street exists where the turn is occurring, and any other relevant reason to the transportation management system. Accordingly, embodiments may determine whether a vehicle is turning using the motion data received from the computing device. Additionally or alternatively, embodiments may use routing information to determine when turns are upcoming and ensure that the received motion data is consistent with the routing information.

If the vehicle is driving straight, the gyroscope data will not change (or will change minimally) from one motion unit to the next and thus, the delta turn angle will be below a threshold angle. Turning may include right or left turns in an intersection, lane changes, U-turns, or any other type of turn.

The method may begin at step 410, where the transportation management system receives an initial motion unit from a computing device. The initial motion unit may be part of a data packet, as discussed above. The initial motion unit may include gyroscope data which indicates a delta turn angle. The delta turn angle may be a measure of how much the computing device has rotated about the vertical axis since the preceding motion unit was measured. As an example and not by way of limitation, the delta turn angle for a motion unit at time t=2 may be 0.25 radians. This means that the computing device has rotated 0.25 radians since the motion unit at time t=1 was measured.

At step 420, the transportation management system may determine whether the delta turn angle is greater than a threshold angle. The threshold angle may be selected such that it is small enough to capture turn angles for typical street geographies (e.g., right turns, left turns, forks in a road, etc.) but not so small that, for example, as a vehicle shifts into a new lane, the shift would be captured as a turn when the vehicle is merely moving straight and veers off the same direction for a moment. This determination may be used to determine whether the vehicle is beginning to turn. If the delta turn angle is greater than the threshold angle, the method proceeds to step 430.

At step 430, the transportation management system determines the position and velocity of the initial motion unit. Determining the position and velocity of the initial motion unit may be done using data other than the motion data. This is because the motion data may only provide information relative to itself and other motion units but not relative to the surrounding geography. In other words, a second motion unit may include information about its position and velocity relative to a first motion unit, but a first motion unit by itself may not include any reference point by which its location or velocity may be determined. Thus, determining the position and velocity of the initial motion unit may involve accessing a source of data other than the motion data. This source may be GPS data, sensor data, any other suitable form of data, a combination of the above data, or a combination of GPS data, sensor data, and motion data. As an example and not by way of limitation, GPS data may indicate a position and velocity for the computing device (and, by extension, the vehicle). However, as stated above, the GPS data may be unreliable in certain circumstances. Thus, the transportation management system may further rely on other types of data, such as sensor data, accelerometer data, or other suitable types of data. For example, sensor data, if available, may indicate that a curb is located twelve feet away from the vehicle. The GPS data may indicate that the vehicle's velocity is 0 mph. Accelerometer data may confirm the GPS velocity by indicating that no movement has occurred for the last fifteen seconds. From the accelerometer data, it may be inferred that the vehicle is stopped. From the other forms of data, it may be determined that the vehicle is in the leftmost lane of an intersection.

At step 440, the transportation management system receives a subsequent motion unit from the computing device. Note that this subsequent motion unit may be received concurrently with the initial motion unit in the same data packet or in a subsequent data packet. The subsequent motion unit may include the same categories of information as the initial motion unit. At step 450, the transportation management system determines whether the delta turn angle for the subsequent motion unit is greater than a threshold angle. This threshold angle may be the same as or different than the threshold angle of step 420. If the delta turn angle for the subsequent motion unit is greater than or equal to the threshold angle, the method proceeds to step 460.

If the delta turn angle is smaller than the threshold angle, the method may end at step 470, because a small turn angle suggests that the vehicle has completed the turn. If the delta turn angle is greater than the threshold turn angle, the method proceeds to step 460, where the transportation management system determines the position and velocity of the subsequent motion unit. The position of the subsequent motion unit may be determined using any suitable method using the motion data that is available in association with the subsequent motion unit. As discussed above, the motion data that is included with a motion unit includes (1) gyroscope data, which indicates how much the computing device has rotated since the data in the preceding motion unit was measured; (2) accelerometer data, which indicates an average acceleration since the data in the preceding motion unit was measured; and/or (3) barometer data, which may be used to determine the elevation of the computing device.

One method suitable for determining the position and velocity of the subsequent motion unit is to determine a vector that has a direction and a magnitude for the subsequent motion unit. The direction of the vector may be determined using the delta turn angle. As an example and not by way of limitation, the delta turn angle for the subsequent motion unit may be 0.20 radians. The direction of the vector may be 0.20 radians to the left of the heading of the preceding (e.g., initial) motion unit. If the delta turn angle is negative, the direction may be to the right of the heading of the preceding motion unit. The magnitude of the vector may represent the displacement of the computing device since the data of the preceding motion unit was measured and may be calculated using any suitable method, including the classical Newtonian physics equation $d = vt + 1/2at^2$, where d is the displacement of the computing device since the preceding motion unit, v is the velocity of the preceding motion unit, a is the average acceleration since the preceding motion unit, and t is the time that has passed since the preceding motion unit. As an example and not by way of limitation, if the velocity of the initial motion unit is 0 mph, the time between the initial motion unit and the first subsequent motion unit is 1 second, and the average acceleration during that 1 second is 4.1 m/s$^2$, the displacement d may be calculated to be 2.05 meters. If the delta turn angle is 0.20 radians, the location of the first subsequent motion unit may be 2.05 meters from the location of the initial motion unit at an angle of 0.20 radians to the left of the heading of the initial motion unit. Steps 440 through 460 are to be repeated until the delta turn angle is smaller than the threshold angle, at which point the method may end. Once the positions of each motion unit are determined, they may be plotted on a digital map as circles, as shown in FIG. 3.

In particular embodiments, the transportation management system may generate a motion-data trace of a path by connecting the plotted circles. The motion-data trace of the path may represent the path that the computing device traveled as measured by one or more sensors on the computing device and processed by either the computing device or the transportation management system. This representation may more accurately estimate the actual path of the computing device than the location points provided by the GPS data. An example of the path generated by the transportation management system is illustrated by the lines that connect the circles of FIG. 3. In particular embodiments, the transportation management system may use the motion-data trace of the path to determine a distance traveled by the vehicle. The transportation management system may determine the distance traveled by the vehicle by summing the magnitudes of the vectors associated with each motion unit. As an example and not by way of limitation, there may be five motion units in a sequence of motion units similar to those of FIG. 3. Their respective vectors may have magnitudes of 1.83 m, 2.05 m, 1.90 m, 2.11 m, and 1.79 m. The distance traveled by the computing device for the area corresponding to these motion units may be 1.83+2.05+1.90+2.11+1.79=9.68 meters. In many cases, this method of calculating the distance traveled by the vehicle may be more accurate than using GPS data to calculate the distance traveled by the vehicle. In particular embodiments, the transportation management system may combine the above method with GPS data to calculate the distance a vehicle travels. As an example and not by way of limitation, the transportation management system may use GPS data to calculate the distance traveled when GPS data is reliable, but when GPS data is unreliable, the transportation management system may instead use the sum of the motion unit vectors, as described above. Determining when GPS data is reliable or not is discussed below.

Figure 5:
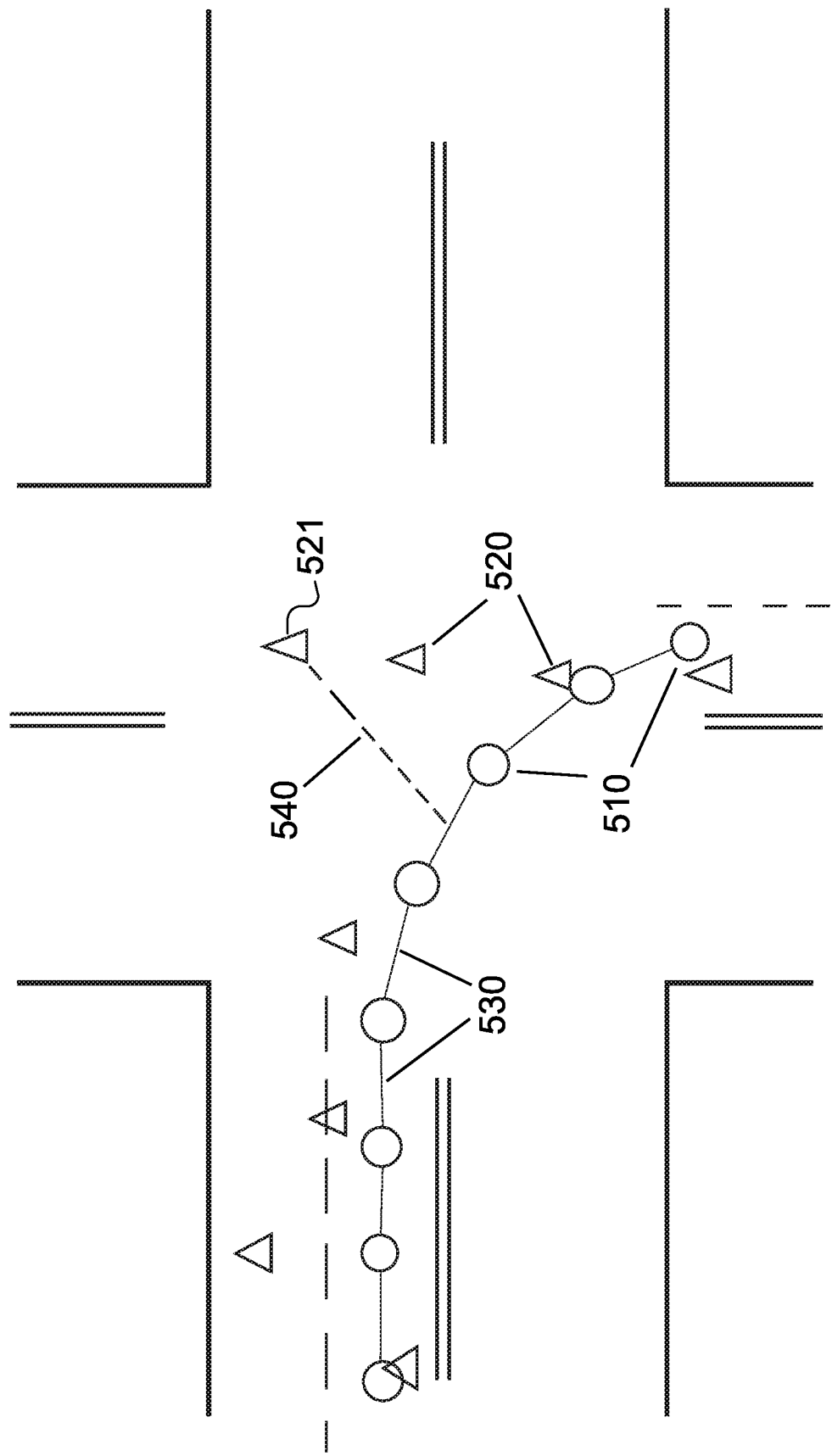
FIG. 5 illustrates an example representation of motion data and an example representation of location data for a mobile computing device.

FIG. 5 illustrates an example representation of motion data as motion units 510 and an example representation of location data as location points 520 for a mobile computing device. The motion-data trace of the path may be lines 530 that connect each motion unit 510. In particular embodiments, the location points 520 are gathered concurrently with the motion data by the computing device. In particular embodiments, the transportation management system may determine that at least one of the location points 520 is beyond a threshold distance from the motion-data trace of the path (e.g., location point 521). The transportation management system may make this determination by measuring the distance between each location point 520 and a point on the motion-data trace of the path represented by lines 530. If there is no point on the motion-data trace of the path that is within a threshold distance 540 from the location point, the transportation management system may determine that the location point is erroneous.

In some embodiments, the threshold distance may be selected by the transportation management system such that significantly inaccurate or errant GPS locations will be identified but typical fluctuations in GPS locations may be within the threshold. For example, GPS locations may typically fluctuate off of a traveled path by a small amount (e.g., within a couple feet) in areas with strong GPS connectivity and this fluctuation may not drastically affect the location determinations of the transportation management system. However, as described above, errant GPS locations may be 1 meter, 5 meters, or 50 meters off of an actual location of a computing device. Accordingly, in some embodiments, the threshold distance may be set at 1 meter, 2 meters, and/or any other relevant distance depending on the level of accuracy desired by the transportation management system.

In particular embodiments, the transportation management system may measure the distance between each motion unit 510 and a particular location point (e.g., location point 521). If there is no motion unit within threshold distance 540 from the location point, the transportation management system may determine that the location point is erroneous. As a result, the transportation management system may remove the location point from being used for location purposes. Removing the location point from being used for location purposes may not necessarily mean deleting the location point from a data store (although that could be what happens). Rather, removing the location point may mean that the transportation management system does not use the location point when: (1) determining the location of the vehicle, (2) determining the distance traveled by the vehicle, (3) generating a behavioral map (discussed below), (4) determining ride fare, (5) generating navigation instructions, or (6) performing any other action that relies on location accuracy.

Figure 6:
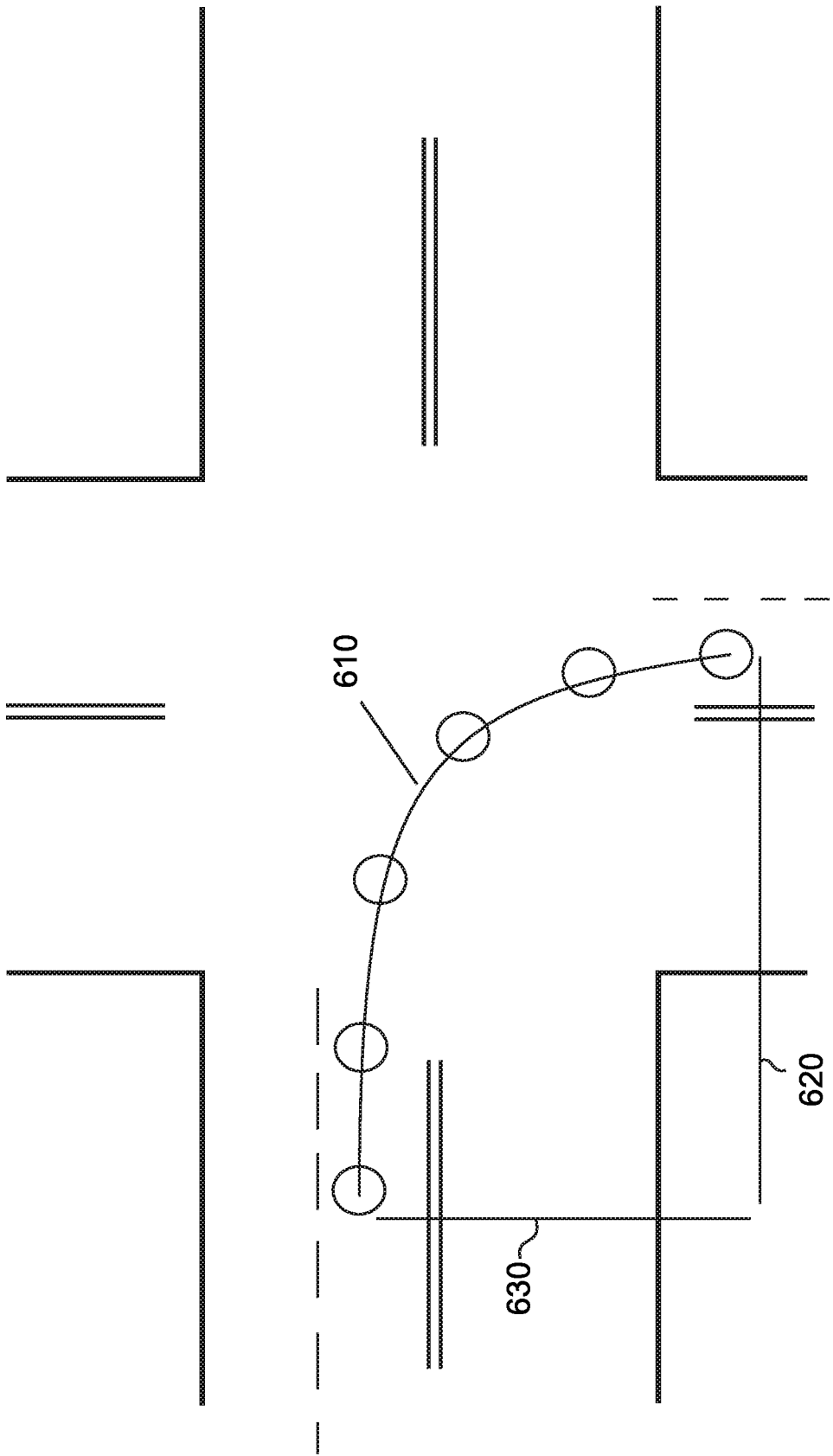
FIG. 6 illustrates an example turn trajectory based on example motion data for a mobile computing device.

FIG. 6 illustrates an example turn trajectory 610 based on example motion data for a mobile computing device. In particular embodiments, the transportation management system determines turn trajectory 610 based on the sequence of motion units with delta turn angles (e.g., the motion units illustrated by circles in FIG. 3). The turn trajectory 610 may be determined by smoothing the motion-data trace of the path made from connecting the circles corresponding to motion units. The turn trajectory 610 may need to cover a particular horizontal distance 620 as well as a particular vertical distance 630. The turn trajectory 610 may be created from a single motion-data trace of a single path or may be made from a several motion-data traces of paths traveled by several vehicles. This will be discussed further below. In particular embodiments, the turn trajectory 610 may be provided as a projected turn trajectory to an autonomous vehicle for use in autonomous navigation. In particular embodiments, the turn trajectory 610 may be made from a composite of one or more points of the motion-data trace of the path and the received location points. As an example and not by way of limitation, a received location point may be located beyond a threshold distance from a point on the motion-data trace of the path. The point on the motion-data trace of the path may be the closest point on the motion-data trace of the path to the received location point, or the point on the motion-data trace of the path may correspond to the received location point. If the received location point is located beyond the threshold distance from the point on the motion-data trace of the path, the transportation management system may generate the turn trajectory 610 using (1) the point on the motion-data trace of the path used for calculating the distance associated with each of the at least one location point and (2) the received location point for each of the sequence of location points whose associated distance is at or within the threshold distance.

Figure 7:
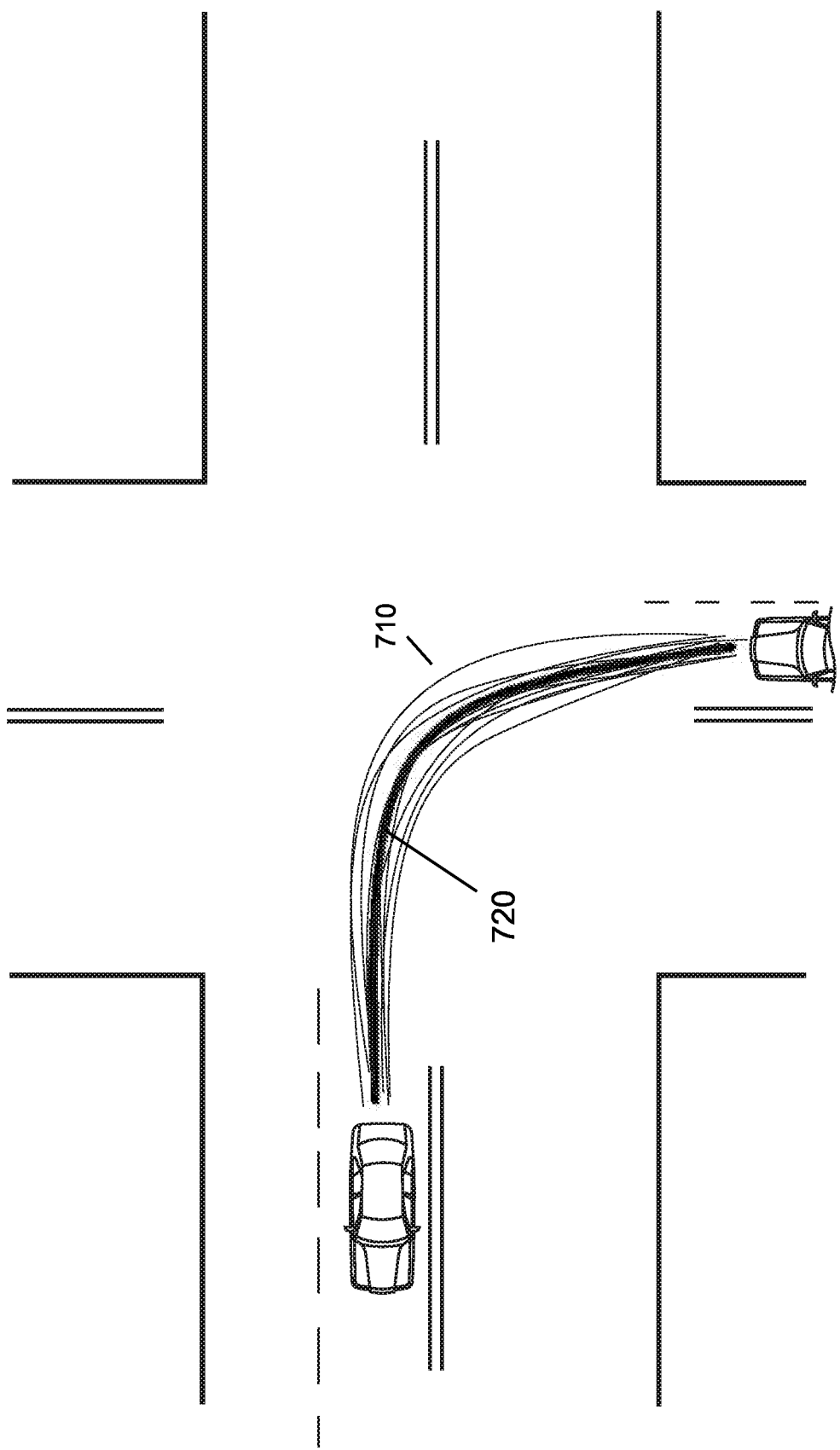
FIG. 7 illustrates several example motion-data traces of paths that several vehicles have taken in an example location.

FIG. 7 illustrates several example motion-data traces of paths 710 that several vehicles have taken in an example location. These motion-data traces of paths 710 may have been generated using the methods described herein (e.g., the method of FIG. 4). Having several motion-data traces of paths may be useful to the transportation management system because they show the paths that several vehicles have taken in a given location, as indicated by the motion data. This may be useful information in generating a "behavioral map" as well as in providing an autonomous vehicle with an average turn trajectory for a given intersection. For example, an intersection may have a left turn lane, as is illustrated in FIG. 7. By analyzing how several human drivers have navigated a left turn out of the left turn lane, the transportation management system may determine an average path 720 that the drivers have taken for the intersection. The average path 720 may be determined by averaging equivalent motion unit locations for each path.

As an example and not by way of limitation, each path for the intersection in FIG. 7 may be generated from six motion units. The transportation management system may analyze five paths (although more than 5 are shown in FIG. 7). Assume the first motion unit for each of the five paths is determined to have the x-y coordinates as shown in Table 2. Averaging those coordinates produces a first average motion unit with x-y coordinates (0.19), (0.26). The transportation management system may perform this averaging calculation for each set of motion units for all the paths.

TABLE 2

Example x-y coordinates for first motion units of 5 paths

| Path Number | x-coordinate | y-coordinate |
|---|---|---|
| 1 | 0.31 | 0.22 |
| 2 | −0.12 | 0.57 |
| 3 | 0.30 | 0.38 |
| 4 | −0.06 | 0.21 |
| 5 | 0.53 | −0.09 |
| Average | 0.19 | 0.26 |

Once the average motion unit locations are determined, the transportation management system may use this information to generate an average motion-data trace and an average turn trajectory and provide the average turn trajectory to an autonomous vehicle. The autonomous vehicle may use the average turn trajectory as input for navigating the turn through the intersection. Turn trajectories and average turn trajectories may be generated for any number of intersections, corners, parking lots, or roads that an autonomous vehicle may negotiate while driving.

In particular embodiments, the transportation management system may use the turn trajectories to improve high definition maps. High definition maps may be three-dimensional models of streets. As an example and not by way of limitation, the transportation management system may use one or more turn trajectories for a specific intersection to ensure that the high definition map portrays the intersection with the proper dimensions. For example, an intersection in the map may have a length of forty-two feet. But the average turn trajectory for that intersection may suggest that the intersection has a length of thirty-eight feet (e.g., the average turn trajectory is consistent with an intersection with a length of thirty-eight feet). The transportation management system may take this information into account when refining the intersection's dimensions.

In particular embodiments, the transportation management system may generate a behavioral map using the motion data, the motion-data traces of the paths, and/or the turn trajectories. A behavioral map may be a map of driver paths as measured by the computing devices and determined by the transportation management system. The behavioral map may be overlain on a digital street map and may contain paths that drivers typically drive. These paths may be the motion-data traces of the paths or the turn trajectories. The transportation management system may provide the behavioral map to autonomous vehicles for navigation purposes. The behavioral map may be used by a driver or an autonomous navigation system to see how other drivers make a given turn (e.g., how sharp they turn, when they initiate the turn, which lane they enter when completing the turn).

Figure 8:
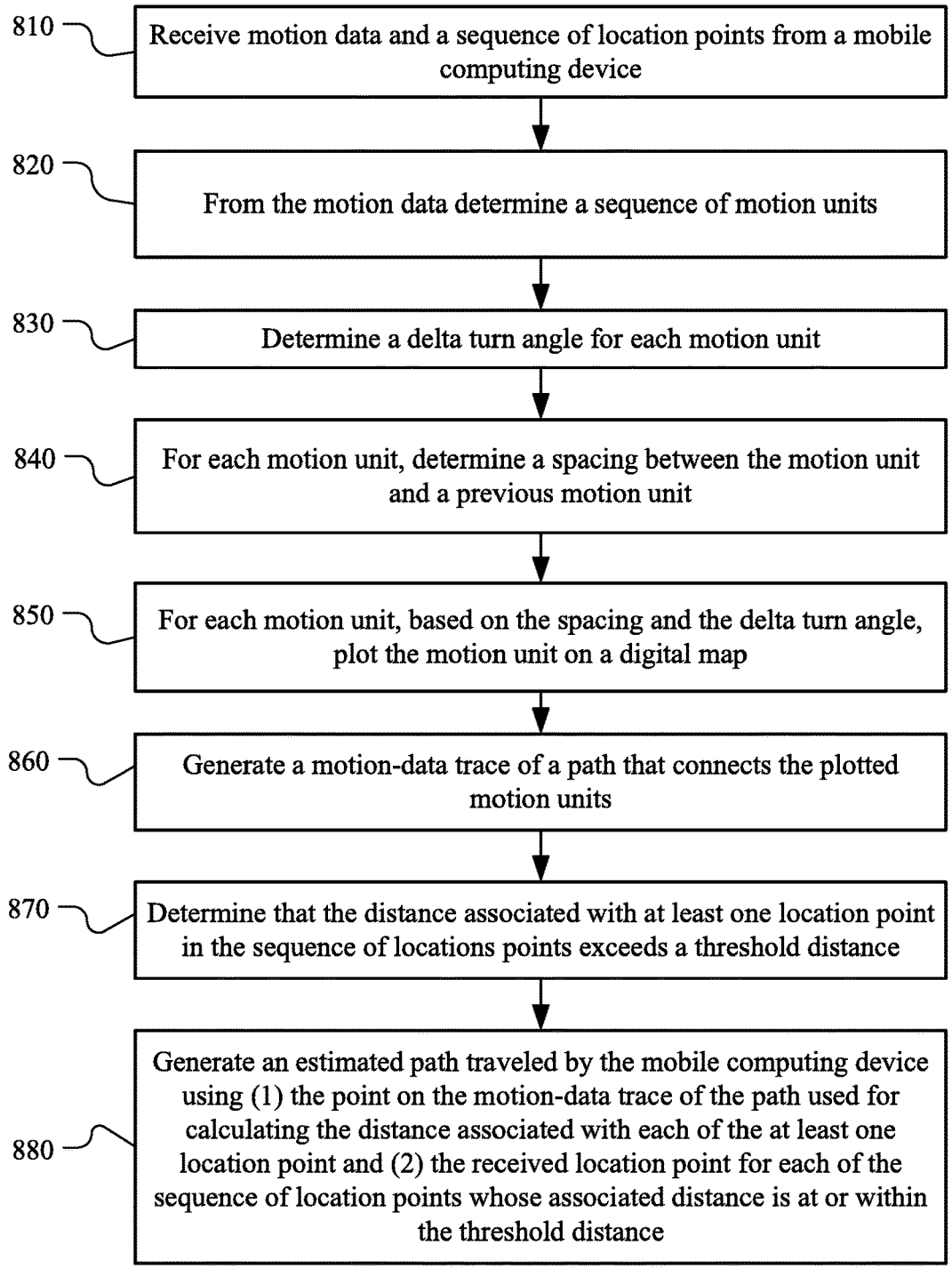
FIG. 8 illustrates an example method for generating an estimated path traveled by a computing device using at least part of a motion-data trace of a path and received location points.

FIG. 8 illustrates an example method 800 for generating an estimated path traveled by a computing device using at least part of a motion-data trace of a path and received location points. The method may begin at step 810, where the transportation management system receives motion data and a sequence of location points from the mobile computing device, as discussed herein. At step 820, the transportation management system may determine a sequence of motion units from the motion data. For example, the motion units may be like those discussed with reference to FIGS. 2 and 3. At step 830, the transportation management system may determine a delta turn angle for each of the motion units, as discussed herein. At step 840, the transportation management system may determine a spacing between the motion unit and a previous motion unit, as discussed herein regarding the vector magnitude for the motion unit. At step 850, the transportation management system plots the motion unit on a digital map based on the spacing and the delta turn angle. This may also be done at least in part by determining the GPS coordinates associated with each location point and then determining the corresponding location on the digital map. At step 860, the transportation management system generates a motion-data trace of a path that connects the plotted motion units, as discussed herein. At step 870, the transportation management system determines that the distance associated with at least one location point in the sequence of locations points exceeds a threshold distance. This determination may be made by calculating, for each location point in the sequence of location points, a distance between the location point and a point on the motion-data trace of the path. As discussed above, the point on the motion-data trace of the path may be the closest point on the motion-data trace of the path to the received location point, or the point on the motion-data trace of the path may correspond to the received location point.

In particular embodiments, the determination of step 870 may be further made or alternatively made based on the GPS signal strength as the GPS data is received by the computing device. The computing device may send, in conjunction with the location data, a report of the GPS signal strength for the received location data. If the signal strength is below a threshold strength, it may be determined that the GPS signal strength is too weak to provide reliable GPS coordinates. Thus, the method of FIG. 8 may further include receiving a signal strength associated with the GPS of the mobile computing device, and determining that the signal strength is below a threshold strength. Based on this information, the transportation management system may make the determination that the trace of the path represents the path traveled by the mobile computing device.

At step 880, the transportation management system generates an estimated path traveled by the mobile computing device using (1) the point on the motion-data trace of the path used for calculating the distance associated with each of the at least one location point and (2) the received location point for each of the sequence of location points whose associated distance is at or within the threshold distance. As an example and not by way of limitation, the sequence of location points may include a first location point and a second location point. The distance between the first location point and a corresponding point on the motion-data trace of the path may be 5 meters. This may exceed the threshold distance. The distance between the second location point and a corresponding point on the motion-data trace of the path may be 0.05 meters. This may be at or within the threshold distance (and thus, may be considered an accurate GPS location). As a result, the transportation management system may discard (e.g., not use for localization) the first location point because it is located beyond the threshold distance (and thus is considered inaccurate). On the other hand, the transportation management system may use the second location point because it is located at or within the threshold distance (and thus, is considered accurate enough to be used by the system). Then, when the transportation management system generates an estimated path that represents the path traveled by the mobile computing device, the transportation management system may not use the first location point but it may use the second location point. Instead of using the first location point, the transportation management system may use the point on the motion-data trace of the path used for calculated the distance associated with the first location point (as the point on the motion-data trace is a more accurate estimate of the actual location of the mobile device than the received errant/inaccurate GPS location). Further, note that in some embodiments, once an inaccurate GPS location is determined, the motion-data trace locations may be used for the generated estimated path traveled by the computing device instead of any of the GPS location data.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating an estimated path traveled by a computing device using at least part of a motion-data trace of a path and received location points including the particular steps of the method of FIG. 8, this disclosure contemplates any suitable method for generating an estimated path traveled by a computing device using at least part of a motion-data trace of a path and received location points including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
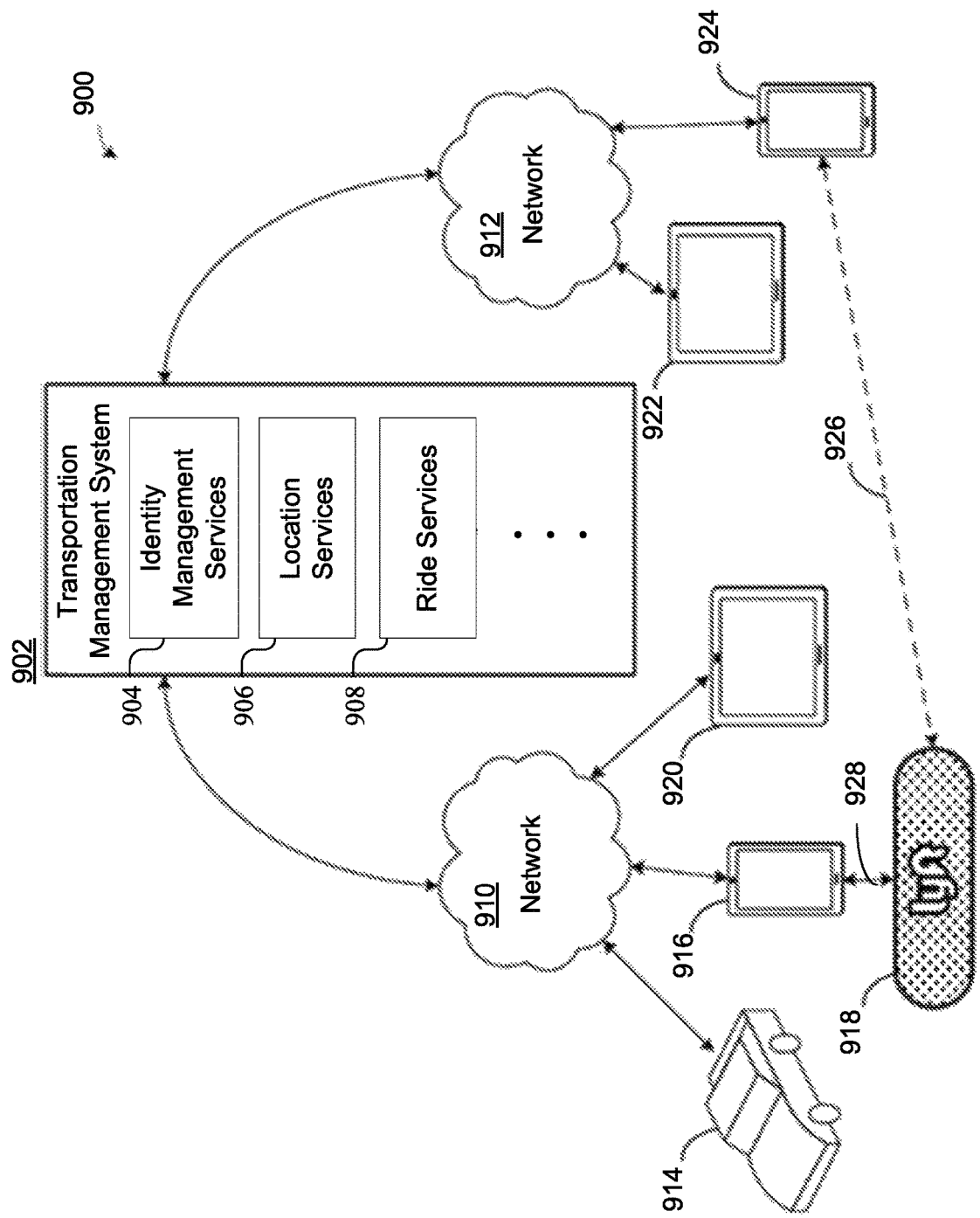
FIG. 9 illustrates an example block diagram of a transportation management environment.

FIG. 9 shows a transportation management environment 900, in accordance with particular embodiments. For example, a transportation management system 902 executing on one or more servers or distributed systems may be configured to provide various services to ride requestors and providers. In particular embodiments, the transportation management system 902 may include software modules or applications, including, e.g., identity management services 904, location services 906, ride services 908, and/or any other suitable services. Although a particular number of services are shown as being provided by system 902, more or fewer services may be provided in various embodiments. In addition, although these services are shown as being provided by the system 902, all or a portion of any of the services may be processed in a distributed fashion. For example, computations associated with a service task may be performed by a combination of the transportation management system 902 (including any number of servers, databases, etc.), one or more devices associated with the provider (e.g., devices integrated with the managed vehicles 914, provider's computing devices 916 and tablets 920, and transportation management vehicle devices 918), and/or one or more devices associated with the ride requestor (e.g., the requestor's computing devices 924 and tablets 922). In particular embodiments, the transportation management system 902 may include one or more general purpose computers, server computers, distributed computing systems, clustered computing systems, cloud-based computing systems, or any other computing systems or arrangements of computing systems. The transportation management system 902 may be configured to run any or all of the services and/or software applications described herein. In particular embodiments, the transportation management system 902 may include an appropriate operating system as well as various server applications, such as web servers capable of handling hypertext transport protocol (HTTP) requests, file transfer protocol (FTP) servers, database servers, etc.

In particular embodiments, identity management services 904 may be configured to, e.g., perform authorization services for requestors and providers and manage their interactions and data with the transportation management system 902. This may include, e.g., authenticating the identity of providers and determining that they are authorized to provide services through the transportation management system 902. Similarly, requestors' identities may be authenticated to determine whether they are authorized to receive the requested services through the transportation management system 902. Identity management services 904 may also manage and control access to provider and requestor data maintained by the transportation management system 902, such as driving and/or ride histories, vehicle data, personal data, preferences, usage patterns as a ride provider and as a ride requestor, profile pictures, linked third-party accounts (e.g., credentials for music or entertainment services, social-networking systems, calendar systems, task-management systems, etc.) and any other associated information. The management service 904 may also manage and control access to provider/requestor data stored with and/or obtained from third-party systems. For example, a requester or provider may grant the transportation management system 902 access to a third-party email, calendar, or task management system (e.g., via the user's credentials). As another example, a requestor or provider may grant, through his/her mobile device (e.g., 916, 920, 922, and 924), a transportation application associated with the transportation management system 902 access to data provided by other applications installed on the mobile device. Such data may be processed on the client and/or uploaded to the transportation management system 902 for processing, if so desired.

In particular embodiments, the transportation management system 902 may provide location services 906, which may include navigation and/or traffic management services and user interfaces. For example, the location services 906 may be responsible for querying devices associated with the provider (e.g., vehicle 914, computing device 916, transportation management vehicle device 918) and the requester (e.g., computing device 924 and tablet 922) for their locations. The location services 906 may also be configured to track those devices to determine their relative proximities, generate relevant alerts (e.g., proximity is within a threshold distance), generate navigation recommendations, and any other location-based services.

In particular embodiments, the transportation management system 902 may provide ride services 908, which may include ride matching and management services to connect a requestor to a provider. For example, after the identity of a ride requestor has been authenticated by the identity management services module 904, the ride services module 908 may attempt to match the requestor with one or more ride providers. In particular embodiments, the ride services module 908 may identify an appropriate provider using location data obtained from the location services module 906. The ride services module 908 may use the location data to identify providers who are geographically close to the requestor (e.g., within a certain threshold distance or travel time) and further identify those who are a good match with the requestor. The ride services module 908 may implement matching algorithms that score providers based on, e.g.: preferences of providers and requestors; vehicle features, amenities, condition, and status; provider's preferred general travel direction, range of travel, and availability; requestor's origination and destination locations, time constraints, and vehicle feature needs; and any other pertinent information for matching requestors with providers. In particular embodiments, the ride services 908 may use rule-based algorithms or machine-learning models for matching requestors and providers.

The transportation management system 902 may communicatively connect to various devices through networks 910 and 912. Networks 910, 912 may include any combination of interconnected networks configured to send and/or receive data communications using various communication protocols and transmission technologies. In particular embodiments, networks 910, 912 may include local area networks (LAN), wide-area network, and/or the Internet, and may support communication protocols such as transmission control protocol/Internet protocol (TCP/IP), Internet packet exchange (IPX), systems network architecture (SNA), and any other suitable network protocols. In particular embodiments, data may be transmitted through networks 910, 912 using a mobile network (such as a mobile telephone network, cellular network, satellite network, or another mobile network), PSTNs (a public switched telephone networks), wired communication protocols (e.g., USB, CAN), and/or wireless communication protocols (e.g., WLAN technologies implementing the IEEE 802.11 family of standards, Bluetooth, Bluetooth Low Energy, NFC, Z-Wave, and ZigBee). In particular embodiments, networks 910, 912 may each include any combination of networks described herein or known to one of ordinary skill in the art.

In particular embodiments, devices within a vehicle may be interconnected. For example, any combination of the following may be communicatively connected: vehicle 914, provider computing device 916, provider tablet 920, transportation management vehicle device 918, requestor computing device 924, requestor tablet 922, and any other device (e.g., smart watch, smart tags, etc.). For example, the transportation management vehicle device 918 may be communicatively connected to the provider computing device 916 and/or the requestor computing device 924. The transportation management vehicle device 918 may connect 926, 928 to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In particular embodiments, users may utilize and interface with one or more services provided by the transportation management system 902 using applications executing on their respective computing devices (e.g., 914, 916, 918, and/or 920), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In particular embodiments, provider computing device 914 may be an add-on device to the vehicle, such as a vehicle navigation system, or a computing device that is integrated with the vehicle, such as the management system of an autonomous vehicle. The computing device may run on any suitable operating systems, such as Android®, iOS®, macOS®, Windows®, Linux®, UNIX®, or UNIX®-based or Linux®-based operating systems, or any other type of operating system or firmware. The computing device may further be configured to send and receive data over the Internet, short message service (SMS), email, and various other messaging applications and/or communication protocols. In particular embodiments, one or more software applications may be installed on the computing device of a provider or requestor, including an application associated with the transportation management system 902. The transportation application may, for example, be distributed by an entity associated with the transportation management system via any distribution channel, such as an online source from which applications may be downloaded and/or via physical media, such as CDs and DVDs. Additional third-party applications unassociated with the transportation management system may also be installed on the computing device. In particular embodiments, the transportation application may communicate or share data and resources with one or more of the installed third-party applications.

Figure 10:
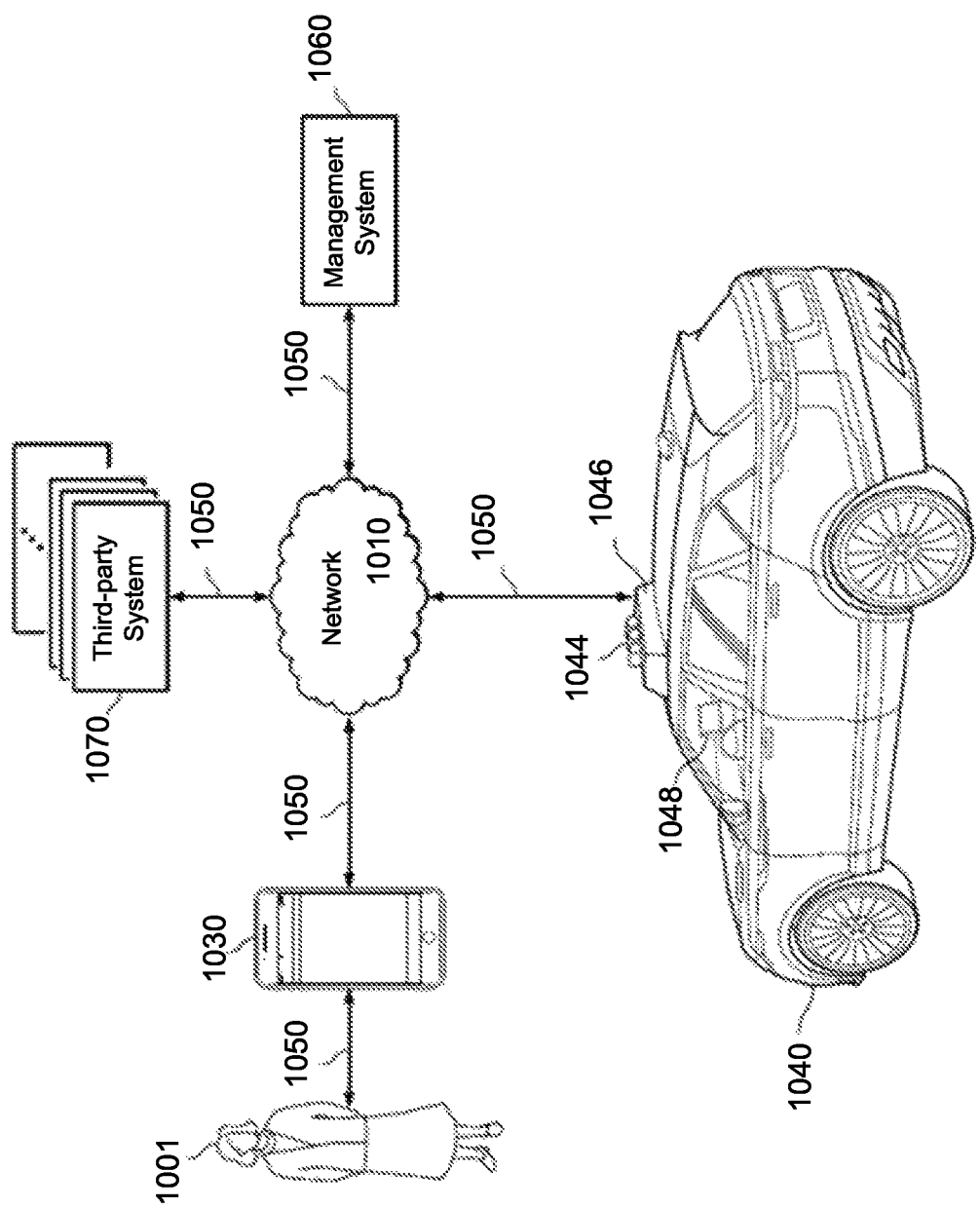
FIG. 10 illustrates an example block diagram of a transportation management environment for matching ride requestors with autonomous vehicles.

FIG. 10 illustrates an example block diagram of a transportation management environment for matching ride requestors with autonomous vehicles. In particular embodiments, the environment may include various computing entities, such as a user computing device 1030 of a user 1001 (e.g., a ride provider or requestor), a transportation management system 1060, an autonomous vehicle 1040, and one or more third-party system 1070. The computing entities may be communicatively connected over any suitable network 1010. As an example and not by way of limitation, one or more portions of network 1010 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 10 illustrates a single user device 1030, a single transportation management system 1060, a single vehicle 1040, a plurality of third-party systems 1070, and a single network 1010, this disclosure contemplates any suitable number of each of these entities. As an example and not by way of limitation, the network environment may include multiple users 1001, user devices 1030, transportation management systems 1060, autonomous-vehicles 1040, third-party systems 1070, and networks 1010.

The user device 1030, transportation management system 1060, autonomous vehicle 1040, and third-party system 1070 may be communicatively connected or co-located with each other in whole or in part. These computing entities may communicate via different transmission technologies and network types. For example, the user device 1030 and the vehicle 1040 may communicate with each other via a cable or short-range wireless communication (e.g., Bluetooth, NFC, WI-FI, etc.), and together they may be connected to the Internet via a cellular network that is accessible to either one of the devices (e.g., the user device 1030 may be a smartphone with LTE connection). The transportation management system 1060 and third-party system 1070, on the other hand, may be connected to the Internet via their respective LAN/WLAN networks and Internet Service Providers (ISP). FIG. 10 illustrates transmission links 1050 that connect user device 1030, autonomous vehicle 1040, transportation management system 1060, and third-party system 1070 to communication network 1010. This disclosure contemplates any suitable transmission links 1050, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 1050 may connect to one or more networks 1010, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1050. For example, the user device 1030 may communicate with the transportation management system via a cellular network and the Internet, but communicate with the autonomous vehicle 1040 via Bluetooth or a physical wire connection.

In particular embodiments, the transportation management system 1060 may fulfill ride requests for one or more users 1001 by dispatching suitable vehicles. The transportation management system 1060 may receive any number of ride requests from any number of ride requestors 1001. In particular embodiments, a ride request from a ride requestor 1001 may include an identifier that identifies the ride requestor in the system 1060. The transportation management system 1060 may use the identifier to access and store the ride requestor's 1001 information, in accordance with his/her privacy settings. The ride requestor's 1001 information may be stored in one or more data stores (e.g., a relational database system) associated with and accessible to the transportation management system 1060. In particular embodiments, ride requestor information may include profile information about a particular ride requestor 1001. In particular embodiments, the ride requestor 1001 may be associated with one or more categories or types, through which the ride requestor 1001 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1060 may classify a user 1001 based on known information about the user 1001 (e.g., using machine-learning classifiers), and use the classification to retrieve relevant aggregate information associated with that class. For example, the system 1060 may classify a user 1001 as a young adult and retrieve relevant aggregate information associated with young adults, such as the type of music generally preferred by young adults.

Transportation management system 1060 may also store and access ride information. Ride information may include locations related to the ride, traffic data, route options, optimal pick-up or drop-off locations for the ride, or any other suitable information associated with a ride. As an example and not by way of limitation, when the transportation management system 1060 receives a request to travel from San Francisco International Airport (SFO) to Palo Alto, California, the system 1060 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 1060. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 1060. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1060 in particular embodiments may predict and provide ride suggestions in response to a ride request. In particular embodiments, the system 1060 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 1060 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1060 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1030 (which may belong to a ride requestor or provider), a transportation management system 1060, vehicle system 1040, or a third-party system 1070 to process, transform, manage, retrieve, modify, add, or delete the information stored in the data store.

In particular embodiments, transportation management system 1060 may include an authorization server (or any other suitable component(s)) that allows users 1001 to opt-in to or opt-out of having their information and actions logged, recorded, or sensed by transportation management system 1060 or shared with other systems (e.g., third-party systems 1070). In particular embodiments, a user 1001 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1001 of transportation management system 1060 through blocking, data hashing, anonymization, or other suitable techniques as appropriate.

In particular embodiments, third-party system 1070 may be a network-addressable computing system that may provide HD maps or hos GPS maps, customer reviews, music or content, weather information, or any other suitable type of information. Third-party system 1070 may generate, store, receive, and send relevant data, such as, for example, map data, customer review data from a customer review website, weather data, or any other suitable type of data. Third-party system 1070 may be accessed by the other computing entities of the network environment either directly or via network 1010. For example, user device 1030 may access the third-party system 1070 via network 1010, or via transportation management system 1060. In the latter case, if credentials are required to access the third-party system 1070, the user 1001 may provide such information to the transportation management system 1060, which may serve as a proxy for accessing content from the third-party system 1070.

In particular embodiments, user device 1030 may be a mobile computing device such as a smartphone, tablet computer, or laptop computer. User device 1030 may include one or more processors (e.g., CPU and/or GPU), memory, and storage. An operating system and applications may be installed on the user device 1030, such as, e.g., a transportation application associated with the transportation management system 1060, applications associated with third-party systems 1070, and applications associated with the operating system. User device 1030 may include functionality for determining its location, direction, or orientation, based on integrated sensors such as GPS, compass, gyroscope, or accelerometer. User device 1030 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 1030 may also include one or more cameras, scanners, touchscreens, microphones, speakers, and any other suitable input-output devices.

In particular embodiments, the vehicle 1040 may be an autonomous vehicle and equipped with an array of sensors 1044, a navigation system 1046, and a ride-service computing device 1048. In particular embodiments, a fleet of autonomous vehicles 1040 may be managed by the transportation management system 1060. The fleet of autonomous vehicles 1040, in whole or in part, may be owned by the entity associated with the transportation management system 1060, or they may be owned by a third-party entity relative to the transportation management system 1060. In either case, the transportation management system 1060 may control the operations of the autonomous vehicles 1040, including, e.g., dispatching select vehicles 1040 to fulfill ride requests, instructing the vehicles 1040 to perform select operations (e.g., head to a service center or charging/ fueling station, pull over, stop immediately, self-diagnose, lock/unlock compartments, change music station, change temperature, and any other suitable operations), and instructing the vehicles 1040 to enter select operation modes (e.g., operate normally, drive at a reduced speed, drive under the command of human operators, and any other suitable operational modes).

In particular embodiments, the autonomous vehicles 1040 may receive data from and transmit data to the transportation management system 1060 and the third-party system 1070. Example of received data may include, e.g., instructions, new software or software updates, maps, 3D models, trained or untrained machine-learning models, location information (e.g., location of the ride requestor, the autonomous vehicle 1040 itself, other autonomous vehicles 1040, and target destinations such as service centers), navigation information, traffic information, weather information, entertainment content (e.g., music, video, and news) ride requestor information, ride information, and any other suitable information. Examples of data transmitted from the autonomous vehicle 1040 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1040, passengers may send/receive data to the transportation management system 1060 and/or third-party system 1070), and any other suitable data.

In particular embodiments, autonomous vehicles 1040 may also communicate with each other as well as other traditional human-driven vehicles, including those managed and not managed by the transportation management system 1060. For example, one vehicle 1040 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 1060 or third-party system 1070).

In particular embodiments, an autonomous vehicle 1040 may obtain and process sensor/telemetry data. Such data may be captured by any suitable sensors. For example, the vehicle 1040 may have a Light Detection and Ranging (LiDAR) sensor array of multiple LiDAR transceivers that are configured to rotate 360°, emitting pulsed laser light and measuring the reflected light from objects surrounding vehicle 1040. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 1040. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 1040 may have optical cameras pointing in different directions. The cameras may be used for, e.g., recognizing roads, lane markings, street signs, traffic lights, police, other vehicles, and any other visible objects of interest. To enable the vehicle 1040 to "see" at night, infrared cameras may be installed. In particular embodiments, the vehicle may be equipped with stereo vision for, e.g., spotting hazards such as pedestrians or tree branches on the road. As another example, the vehicle 1040 may have radars for, e.g., detecting other vehicles and/or hazards afar. Furthermore, the vehicle 1040 may have ultrasound equipment for, e.g., parking and obstacle detection. In addition to sensors enabling the vehicle 1040 to detect, measure, and understand the external world around it, the vehicle 1040 may further be equipped with sensors for detecting and self-diagnosing the vehicle's own state and condition. For example, the vehicle 1040 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 1040 may build a 3D model of its surrounding based on data from its LiDAR, radar, sonar, and cameras, along with a pre-generated map obtained from the transportation management system 1060 or the third-party system 1070. Although sensors 1044 appear in a particular location on autonomous vehicle 1040 in FIG. 10, sensors 1044 may be located in any suitable location in or on autonomous vehicle 1040. Example locations for sensors include the front and rear bumpers, the doors, the front windshield, on the side panel, or any other suitable location.

In particular embodiments, the autonomous vehicle 1040 may be equipped with a processing unit (e.g., one or more CPUs and GPUs), memory, and storage. The vehicle 1040 may thus be equipped to perform a variety of computational and processing tasks, including processing the sensor data, extracting useful information, and operating accordingly. For example, based on images captured by its cameras and a machine-vision model, the vehicle 1040 may identify particular types of objects captured by the images, such as pedestrians, other vehicles, lanes, curbs, and any other objects of interest.

In particular embodiments, the autonomous vehicle 1040 may have a navigation system 1046 responsible for safely navigating the autonomous vehicle 1040. In particular embodiments, the navigation system 1046 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1046 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1046 may use its determinations to control the vehicle 1040 to operate in prescribed manners and to guide the autonomous vehicle 1040 to its destinations without colliding into other objects. Although the physical embodiment of the navigation system 1046 (e.g., the processing unit) appears in a particular location on autonomous vehicle 1040 in FIG. 10, navigation system 1046 may be located in any suitable location in or on autonomous vehicle 1040. Example locations for navigation system 1046 include inside the cabin or passenger compartment of autonomous vehicle 1040, near the engine/battery, near the front seats, rear seats, or in any other suitable location.

In particular embodiments, the autonomous vehicle 1040 may be equipped with a ride-service computing device 1048, which may be a tablet or any other suitable device installed by transportation management system 1060 to allow the user to interact with the autonomous vehicle 1040, transportation management system 1060, other users 1001, or third-party systems 1070. In particular embodiments, installation of ride-service computing device 1048 may be accomplished by placing the ride-service computing device 1048 inside autonomous vehicle 1040, and configuring it to communicate with the vehicle 1040 via a wire or wireless connection (e.g., via Bluetooth). Although FIG. 10 illustrates a single ride-service computing device 1048 at a particular location in autonomous vehicle 1040, autonomous vehicle 1040 may include several ride-service computing devices 1048 in several different locations within the vehicle. As an example and not by way of limitation, autonomous vehicle 1040 may include four ride-service computing devices 1048 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1048 may be detachable from any component of autonomous vehicle 1040. This may allow users to handle ride-service computing device 1048 in a manner consistent with other tablet computing devices. As an example and not by way of limitation, a user may move ride-service computing device 1048 to any location in the cabin or passenger compartment of autonomous vehicle 1040, may hold ride-service computing device 1048 in his/her lap, or handle ride-service computing device 1048 in any other suitable manner. Although this disclosure describes providing a particular computing device in a particular manner, this disclosure contemplates providing any suitable computing device in any suitable manner.

Figure 11:
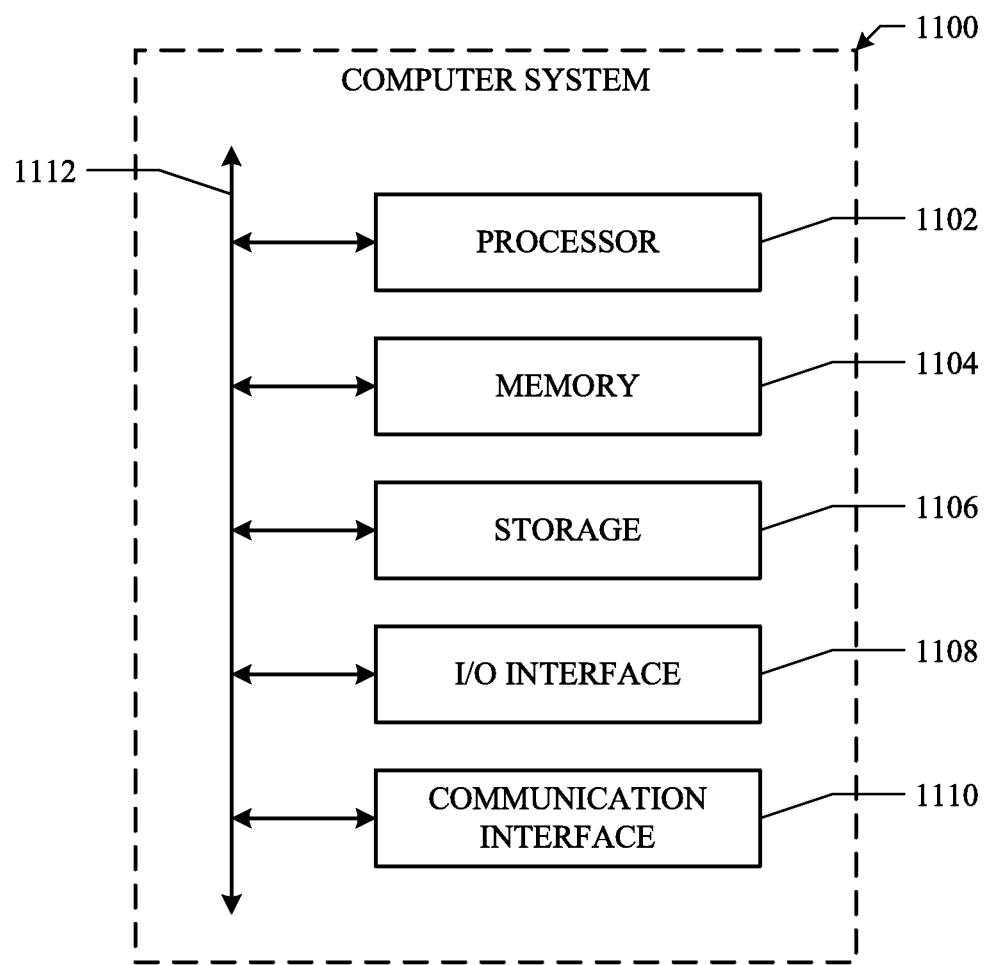
FIG. 11 illustrates an example of a computing system.

FIG. 11 illustrates an example computer system 1100. In particular embodiments, one or more computer systems 1100 perform one or more steps of one or more methods described or illustrated herein. In particular embodiments, one or more computer systems 1100 provide the functionalities described or illustrated herein. In particular embodiments, software running on one or more computer systems 1100 performs one or more steps of one or more methods described or illustrated herein or provides the functionalities described or illustrated herein. Particular embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 that are to be operated on by computer instructions; the results of previous instructions executed by processor 1102 that are accessible to subsequent instructions or for writing to memory 1104 or storage 1106; or any other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs), be a multi-core processor, or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described in further detail below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
  receiving a sequence of location data points associated with a vehicle from a first source and a sequence of motion data points associated with the vehicle from a second source;
  determining a first turn angle of the vehicle during a turn trajectory based on at least one location data point in the sequence of location data points associated with the first source wherein the first turn angle corresponds to a first angular rotation of the vehicle about a vertical axis;
  determining that an additional location data point in the sequence of location data points is inaccurate;
  determining, without using the additional location data point that is inaccurate, a second turn angle of the vehicle during the turn trajectory by using at least one motion data point in the sequence of motion data points corresponding to the additional location data point that is inaccurate, wherein the second turn angle corresponds to a second angular rotation of the vehicle about the vertical axis;
  determining the turn trajectory of the vehicle by integrating at least the first turn angle and the second turn angle; and
  assigning an operation for the vehicle, wherein the operation for the vehicle is based on the determined turn trajectory.

2. The method of claim 1, wherein the sequence of location data points are associated with an area, the method further comprising:
  determining at least one additional turn trajectory based on location data points and motion data points associated with the area; and
  generating an average turn trajectory through the area based on the determined turn trajectory of the vehicle and the at least one additional turn trajectory.

3. The method of claim 1, further comprising:
  determining the turn trajectory of the vehicle based on at least a measure of angular rotation of the vehicle between the first turn angle of the vehicle and the second turn angle of the vehicle.

4. The method of claim 1, further comprising:
  determining a position and a velocity associated with the at least one motion data point based on sensor data received from one or more sensors associated with the vehicle.

5. The method of claim 1, further comprising:
  receiving routing information associated with the determined turn trajectory; and
  generating a navigation path for the vehicle based on the routing information.

6. The method of claim 1, wherein the determining that the additional location data point in the sequence of location data points is inaccurate is based on:
  a distance between the additional location data point and the at least one motion data point in the sequence of motion data points corresponding to the additional location data point exceeding a threshold distance; or
  a signal strength of the additional location data point is associated with a global positioning system (GPS) being below a threshold strength.

7. The method of claim 1, wherein:
  the sequence of location data points are determined by a global positioning system (GPS) of the first source;
  the sequence of motion data points are determined by at least one of an accelerometer or a gyroscope of the second source; and
  the sequence of location data points are determined concurrently with the sequence of motion data points.

8. The method of claim 1, wherein the determining the second turn angle of the vehicle during the turn trajectory by using the at least one motion data point in the sequence of motion data points corresponding to the additional location data point that is inaccurate comprises:
  determining a location associated with the at least one motion data point; and
  updating the additional location data point based on the location associated with the at least one motion data point while calculating the second turn angle.

9. The method of claim 1, further comprising:
  prior to determining the turn trajectory of the vehicle, determining, based on the first turn angle, the second turn angle, and the sequence of location data points, that the vehicle is at an intersection.

10. The method of claim 1, further comprising:
generating a map based on the turn trajectory of the vehicle or the sequence of motion data points associated with the vehicle; or
updating the map using the turn trajectory of the vehicle or the sequence of motion data points associated with the vehicle.

11. The method of claim 1, wherein one or more of the first source or the second source is a sensor unit of the vehicle or a sensor unit carried in the vehicle.

12. The method of claim 1, wherein:
the additional location data point is subsequent to the at least one location data point in the sequence of location data points, or
the additional location data point precedes the additional location data point in the sequence of location data points.

13. The method of claim 1, wherein the first turn angle and the second turn angle are delta turn angles corresponding to an angular rotation of the vehicle about the vertical axis since a preceding location data point or motion data point was measured.

14. The method of claim 1, wherein the operation comprises:
dispatching the vehicle to a selected location;
modifying a navigation path of the vehicle;
operating a component of the vehicle; or
instructing the vehicle to enter an operation mode.

15. A system comprising: one or more processors and one or more computer-readable non-transitory storage media in communication with the one or more processors, the one or more computer-readable non-transitory storage media comprising instructions, that when executed by the one or more processors, are configured to cause the system to perform operations comprising:
receiving a sequence of location data points associated with a vehicle from a first source and a sequence of motion data points associated with the vehicle from a second source;
determining a first turn angle of the vehicle during a turn trajectory based on at least one location data point in the sequence of location data points associated with the first source, wherein the first turn angle corresponds to a first angular rotation of the vehicle about a vertical axis;
determining that an additional location data point in the sequence of location data points is inaccurate;
determining, without using the additional location data point that is inaccurate, a second turn angle of the vehicle during the turn trajectory by using at least one motion data point in the sequence of motion data points corresponding to the additional location data point that is inaccurate, wherein the second turn angle corresponds to a second angular rotation of the vehicle about the vertical axis;
determining the turn trajectory of the vehicle by integrating at least the first turn angle and the second turn angle; and
assigning an operation for the vehicle, wherein the operation for the vehicle is based on the determined turn trajectory.

16. The system of claim 15, wherein the sequence of location data points are associated with an area and wherein the one or more processors are further configured to cause the system to perform operations further comprising:
determining at least one additional turn trajectory based on location data points and motion data points associated with the area; and
generating an average turn trajectory through the area based on the determined turn trajectory of the vehicle and the at least one additional turn trajectory.

17. The system of claim 15, wherein the one or more processors are further configured to cause the system to perform operations further comprising:
determining the turn trajectory of the vehicle based on at least a measure of angular rotation of the vehicle between the first turn angle of the vehicle and the second turn angle of the vehicle.

18. The system of claim 15, wherein the one or more processors are further configured to cause the system to perform operations further comprising:
determining a position and a velocity associated with the at least one motion data point based on sensor data received from one or more sensors associated with the vehicle.

19. One or more computer-readable non-transitory storage media including instructions that, when executed by one or more processors, are configured to cause the one or more processors to perform operations comprising:
receiving a sequence of location data points associated with a vehicle from a first source and a sequence of motion data points associated with the vehicle from a second source;
determining a first turn angle of the vehicle during a turn trajectory based on at least one location data point in the sequence of location data points associated with the first source, wherein the first turn angle corresponds to a first angular rotation of the vehicle about a vertical axis;
determining that an additional location data point in the sequence of location data points is inaccurate;
determining, without using the additional location data point that is inaccurate, a second turn angle of the vehicle during the turn trajectory by using at least one motion data point in the sequence of motion data points corresponding to the additional location data point that is inaccurate, wherein the second turn angle corresponds to a second angular rotation of the vehicle about the vertical axis;
determining the turn trajectory of the vehicle by integrating at least the first turn angle and the second turn angle; and
assigning an operation for the vehicle, wherein the operation for the vehicle is based on the determined turn trajectory.

20. The one or more computer-readable non-transitory storage media of claim 19, wherein the sequence of location data points are associated with an area and wherein the instructions are further configured to cause the one or more processors to perform operations further comprising:
determining at least one additional turn trajectory based on location data points and motion data points associated with the area; and
generating an average turn trajectory through the area based on the determined turn trajectory of the vehicle and the at least one additional turn trajectory.

* * * * *